United States Patent
Coulthard

(10) Patent No.: US 7,107,546 B2
(45) Date of Patent: Sep. 12, 2006

(54) TOGGLEABLE WIDGET FOR A USER INTERFACE

(75) Inventor: Phil Coulthard, Aurora (CA)

(73) Assignee: International Business Machines Corporation, Armonk, NY (US)

( * ) Notice: Subject to any disclaimer, the term of this patent is extended or adjusted under 35 U.S.C. 154(b) by 773 days.

(21) Appl. No.: 10/286,583

(22) Filed: Oct. 31, 2002

(65) Prior Publication Data

US 2003/0222918 A1 Dec. 4, 2003

(30) Foreign Application Priority Data

May 29, 2002 (CA) ................................ 2388150

(51) Int. Cl.
*G06F 9/00* (2006.01)
*G06F 17/00* (2006.01)
*G06F 3/00* (2006.01)

(52) U.S. Cl. ........................ 715/780; 715/822; 715/824

(58) Field of Classification Search ................ 715/780, 715/822, 824, 840, 835, 760, 507, 508, 506, 715/505
See application file for complete search history.

(56) References Cited

U.S. PATENT DOCUMENTS

| | | | |
|---|---|---|---|
| 5,732,219 A | 3/1998 | Blumer et al. | 395/200.57 |
| 5,884,078 A | 3/1999 | Faustini | 395/701 |
| 5,913,063 A | 6/1999 | McGurrin et al. | 395/702 |
| 5,913,065 A | 6/1999 | Faustini | 715/866 |
| 5,973,670 A * | 10/1999 | Barber et al. | 345/157 |
| 6,041,179 A | 3/2000 | Bacon et al. | 395/709 |
| 6,044,398 A | 3/2000 | Marullo et al. | 709/249 |
| 6,085,034 A | 7/2000 | Danforth | 395/703 |
| 6,085,228 A | 7/2000 | Tharakan | 709/203 |
| 6,139,198 A | 10/2000 | Danforth et al. | 395/704 |
| 6,141,792 A | 10/2000 | Acker et al. | 717/5 |
| 6,151,609 A | 11/2000 | Truong | 707/505 |
| 6,158,044 A | 12/2000 | Tibbetts | 717/1 |
| 6,195,794 B1 | 2/2001 | Buxton | 717/11 |

(Continued)

FOREIGN PATENT DOCUMENTS

EP 0684541 A2 11/1995

(Continued)

OTHER PUBLICATIONS

Transferring Data and Storing Metadata Across A Network, Phil Coulthard et. al., filed Oct. 31, 2002, U.S. Appl. No. 10/286,560.

(Continued)

*Primary Examiner*—Raymond J. Bayerl
*Assistant Examiner*—Anita Datta Chaudhuri
(74) *Attorney, Agent, or Firm*—Mark S. Walker; Streets & Steele; Jeffrey L. Streets

(57) ABSTRACT

A composite interface widget for toggleable entry fields that minimizes real estate and allows the entry field to toggle between a special kind of input that is either a predefined value or a value specified by the user. The widget presents a local or noninherited state which enables the widget to have an entry field with editing capability; alternatively, the widget offers an inherit state having a read-only entry field that displays a present input string. The user is given a small concise button or other icon to toggle between the two states. The programmer specifies the initial state, the string to display in the inherit mode, and the initial value for the local or noninherit mode. The programmer can subsequently query if the user chose the inherit mode or chose the local mode and, if so, what local value was entered.

20 Claims, 4 Drawing Sheets

U.S. PATENT DOCUMENTS

| | | | |
|---|---|---|---|
| 6,335,738 B1* | 1/2002 | Englefield et al. | 715/744 |
| 6,341,359 B1* | 1/2002 | Aiken et al. | 714/100 |
| 6,589,290 B1* | 7/2003 | Maxwell et al. | 715/507 |
| 6,907,580 B1* | 6/2005 | Michelman et al. | 715/856 |
| 2002/0099456 A1* | 7/2002 | McLean | 700/83 |
| 2002/0105504 A1* | 8/2002 | Toepke et al. | 345/173 |
| 2002/0133440 A1* | 9/2002 | Chalke et al. | 705/35 |
| 2002/0156774 A1* | 10/2002 | Beauregard et al. | 707/3 |
| 2003/0040340 A1* | 2/2003 | Smethers | 455/566 |
| 2003/0174158 A1* | 9/2003 | Costea et al. | 345/700 |
| 2003/0206195 A1* | 11/2003 | Matsa et al. | 345/744 |

FOREIGN PATENT DOCUMENTS

| | | |
|---|---|---|
| JP | 9244837 A | 9/1997 |

OTHER PUBLICATIONS

Editing Files of Remote Systems Using an Integrated Development Environment, Kushal s. Munir et al. filed Oct. 31, 2002, U.S. Appl. No. 10/285,996.

Dynamic Generic Framework for Distributed Tooling, Dave McKnight, filed Apr. 29, 2002, U.S. Appl. No. 10/134,190.

Framework To Access A Remote System From An Integrated Development, Phil, Coulthard et al., filed Oct. 31, 2002, U.S. Appl. No. 10/286,559.

Accessing A Remote Iseries or AS/400 Computer System From An Integrated Development Environment, Phil Coulthard et al., filed Oct. 31, 2002, U.S. Appl. No. 10/285,993.

* cited by examiner

TOGGLEABLE WIDGET FOR A USER INTERFACE

TECHNICAL FIELD

This invention relates generally to the field of computer user interfaces and more particularly relates to a widget or an entry field from which a user can toggle on an inherited value or on a noninherited value which then allows the user to enter another value.

BACKGROUND OF THE INVENTION

A user interface is that by which a computer user interacts with a computer and its various programs called applications. A nearly universal format of user interface for personal computer systems and personal digital assistants (PDAs) is a visual interface—called a graphical user interface: GUI (pronounced goo' eee). Other user interfaces may be tactile or may be aural. Typically with graphical user interfaces, the user controls a graphical pointer such as a mouse, a track ball, a glidepad, or stylus to interact with a display of a graphical user interface. Depending upon the actions allowed by the application or operating system software, the user can select a feature of the graphical display such as an icon or an entry field by positioning the graphical pointer over the feature and making a selection utilizing the graphical pointing device. These features have come to be called widgets.

The actions available to a user following selection of a widget can depend upon a number of factors including the type of widget that was selected and the order of the selection in the current interaction scenario. For example, if the user selects a icon on the desktop or within a window with a single click of a mouse button, the user can typically relocate the icon within the graphical display utilizing the well-known drag-and-drop technique. Alternatively, if the selected widget is a menu bar choice, a dropdown menu may be displayed permitting the user to make a single selection from among the choices listing in the dropdown menu. In response to either the selection of a point outside of the dropdown menu indicating that the user does not wish to select any choice listed in the dropdown menu or the selection of a dropdown menu choice, the dropdown menu closes automatically.

Object-oriented programming (OOP) is becoming the normative computer programming paradigm because it allows programmers to approach their programming tasks more intuitively by using objects rather than procedures as the fundamental building blocks for creating computer programs. Objects are small reusable sections of program code that can be quickly and easily combined to create new and many different applications across a network irrespective of the computer processor's architecture and/or operating system. Conceptually, an object is an entity that is able to save information, referred to as its state, and offers a number of behaviors or functions to either examine or affect this state. An object may model the attributes or characteristics of the real-world object and, in many cases, may also model its behavior. For example, an OOP employee object may have certain attributes of a real employee, such as a name, an address, and an employee number, etc. and could respond as a real employee such that the employee object could provide the employee's address when asked for that information or provide the employee's status, e.g., "on vacation," when asked for status information. Another example maybe a calendar object which may be used in several applications such as a scheduling application, a presentation application, and/or a data base application to calculate employee's vacation and pay, etc.

A fundamental concept in OOP is the class. A class is a template or prototype that defines a type of object and specifies the attributes and methods associated with objects or members of the class. Objects of the same class have the same definition for their operations and information structures. An object is created or instantiated at runtime, i.e., when the computer executes a statement in the program.

Encapsulation, inheritance and polymorphism are three important concepts that further differentiate OOP from procedural programming. Encapsulation means keeping the data structure and the methods/functions that process the data together in the same class. Inheritance is the ability to derive a new class from one or more existing classes. The new class, known as a subclass, inherits or incorporates all properties of a parent class including its attributes and its methods. The new class or subclass may be further defined to include additional properties. An example of inheritance might be that a new class square inherits all the attributes and methods of objects in the class rectangle, but the new class square can be modified so that the methods to calculate area or perimeter can be particularized using polymorphism. Polymorphism is that concept of OOP that allows the same name to be used in a parent class and an inherited or subclass but the subclass may provide a different version of a method with the same name the exists in the base class, such as calculation of the area of a square.

Often when writing graphical user interfaces for applications or application development tools, the user is prompted for a special kind of input. This special input may be a predefined value or a user-specified value. Designing a user interface for these special inputs requires special considerations. There needs to be an entry field to allow the user to enter a specific local value, such as a port number, userid or owner name. That entry field, moreover, should be disabled unless the user enters a value other than the inherited or special value.

Graphical user interfaces have presented options to enter predefined and user input data in several ways. A typical option for input on a graphical user interface is a checkbox. A checkbox with a label such as "Use default value" may be combined with an entry field. The programmer listens for that checkbox to be selected and, when selected, toggles the entry field between read-only, i.e., read the value in the checkbox, and write-capable, i.e., read that value entered by the user. In the case of the checkbox, the programmer has to toggle the contents of the entry field between the special value and the last-user-entered value. The disadvantage of the checkbox is that it requires additional programming effort, and more user-interface real estate is required to show both the checkbox and the entry field.

Another option is to use a combination input field known as an editable dropdown, which is an entry field where the user can type in a value or activate a dropdown list containing only one entry—the special value. When selected, the special value from the list replaces the contents of the entry field. The user then can either type a local value into the entry field or select the special value from the dropdown list. The dropdown list requires additional programming effort. The programmer has to disable error checking when the special value is selected and reenable error checking when the user starts typing. From the user point of view, this is not an intuitive use of dropdown list boxes, as these are typically used for a multiple selection design pattern, not a binary decision design pattern. The user expects to see multiple values in a list box, not a single value.

There are additional problems associated with both the checkbox and the dropdown approach. The checkbox approach requires a lot of real estate to visually show both the button with its label text, and the entry field. The dropdown list is difficult if the special value is a different data type than what the user is allowed to specify. For example, with a port number, the user entry will be restricted to numbers. Yet the special value "first available" is not a number, it is a string. Placing that string in the entry field of a dropdown list causes the error-checking code to flag it as invalid because it is not a positive integer value. Special case coding thus is required every time the case changes which becomes tricky for the programmer, especially if the special value string is translated into multiple languages. Furthermore, using a full-function dropdown to list a single choice is overkill for the problem. Typically dropdown lists contain multiple values from which to choose.

Just the fact there are multiple approaches to this common design problem indicates the need for a user interface widget designed and optimized for binary decision making wherein the decision may involve different data types. If used consistently, then user quickly learns that he is being asked to make a binary decision between a special value and user-entered value of his choice. This makes the product more usable and is less confusing to the user.

SUMMARY OF THE INVENTION

These needs and others that will become apparent to one skilled in the art are satisfied by a method for presenting two options on a user interface of a microprocessor logic device, comprising: presenting an entry field for input of data; presenting a toggleable switch to activate the entry field; allowing a user to input data in the entry field when the toggleable switch is activated in a first position; and deactivating the entry field and displaying an inherited value in the entry field when the toggleable switch is in a second position. Depending upon the position of the toggleable switch, either the input data or the inherited value is transferred to an executing application requiring that data. The transfer may occur through a network, which may be the Internet.

The microprocessor logic device may be any of a number of devices, e.g., stand-alone computer, a personal digital assistant, a wireless telephone, an interactive television.

In any event, the toggleable switch may be part of a user interface, which if it is a graphical user interface, the inherited value may be communicated to the user by invoking hover help to set forth the inherited value and/or requesting special input data from the user. The user interface may be of a different sensory input and so the step of communicating the inherited value to the user may further take advantage of a voice or aural tones, or tactile sensations.

The data input by the user may be of a different data type than the inherited value. When the toggleable switch is in the second position the inherited value may be inherited from a parent class in object oriented programming and the user input data when in the first position is not necessarily an inherited value from the parent class. The entry field, moreover, may invoke error-checking when in the first position.

Features of the invention may further be considered a widget for use with an application having a user device on a logical device, comprising: a switch to manage an entry field wherein when the switch is in an inheritable mode the widget presents an entry field that is a read-only entry field displaying a preset value determined by the application; and when the switch is in a local mode, the widget presents an write-enable entry field to allow the user to enter a different value.

The invention may further be considered a computer program product including instructions embodied on a computer readable medium for providing a user interface having a toggleable widget, the toggleable widget comprising: a field having a first choice that is an inherited default non-editable choice; and a toggle to change the field to one having a second choice entered by a user.

DETAILED DESCRIPTION OF THE INVENTION

Figures 1A, 1B:
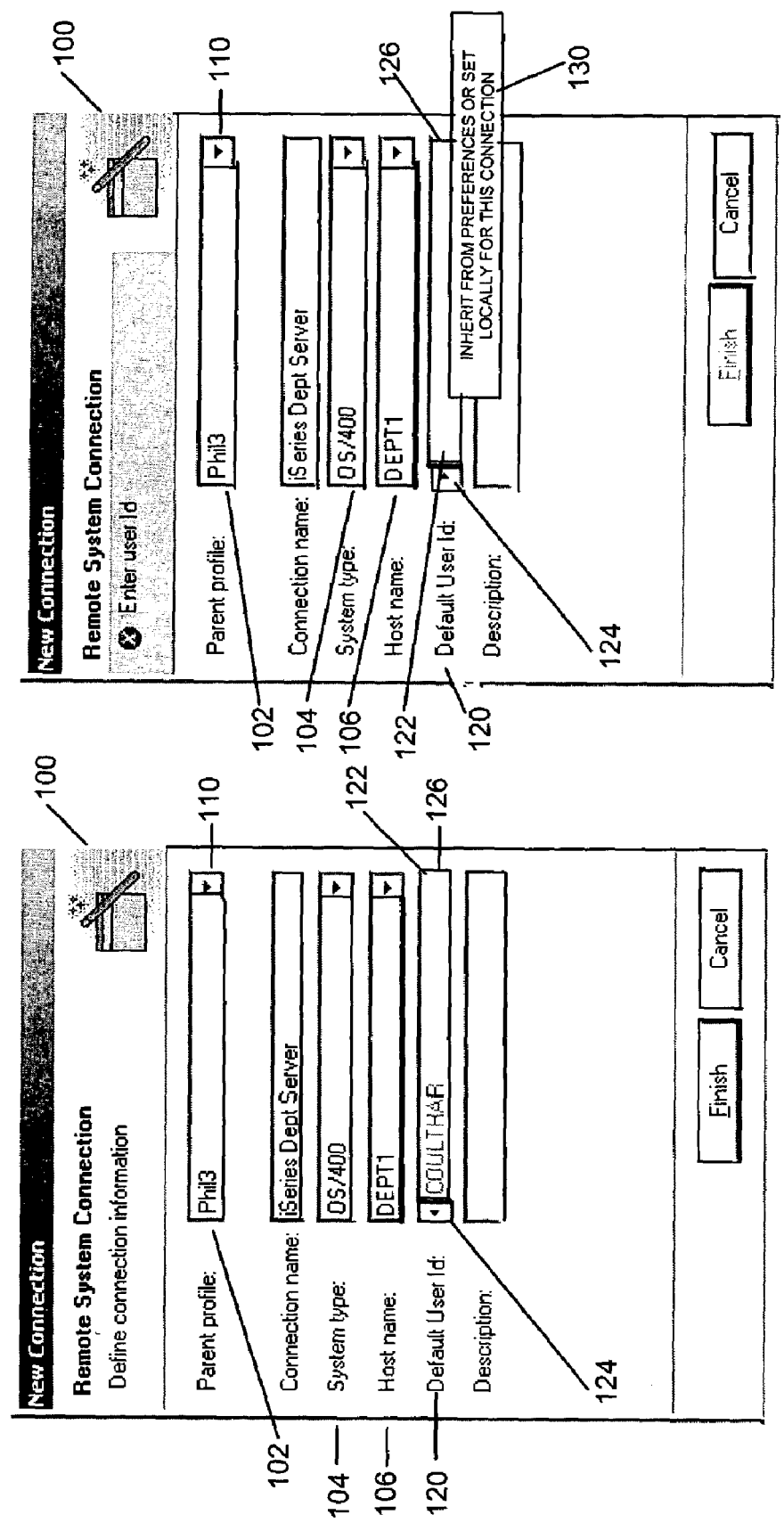
FIGS. 1a and 1b are examples of a graphical user interface that can take advantage of a toggleable widget in accordance with an embodiment of the invention. It is suggested that FIGS. 1a and 1b be printed on the face of the patent.

Referring to the Drawing, wherein like numbers denote like parts throughout the several views and as will be described in detail below, aspects of the preferred embodiment pertain to a unique user interface having a toggleable widget implementable on a logic or microprocessor device. The user interface may be graphical, such as is used on visual displays associated with computer monitors, laptops, personal computers, personal digital assistants, cellular phones, interactive television, home logic devices, and other displays. The user interface could also be aural, such as a speech recognition input interface or tactile for touch. In an alternative embodiment, the invention may be implemented as a computer program-product for use with a user interface. The programs defining the functions of the toggleable widget can be delivered to the computer and/or to a microprocessor or logic device having a user interface via a variety of signal-bearing media, which include, but are not limited to: (a) information permanently stored on non-writable storage media, e.g., read only memory devices within either computer such as CD-ROM disks readable by CD-ROM drive; (b) alterable information stored on writeable storage media, e.g., floppy disks within diskette drive or hard-disk drive; or (c) information conveyed to a computer by a telephone or a cable media network, including wireless communications.

The preferred embodiment of the invention has features containing a graphical user interface with a toggleable entry field which minimizes real estate, i.e., not only lines of code and memory space necessary to implement the toggleable widget but also, if a graphical user interface, the screen area consumed by the toggleable widget. The toggleable widget allows the entry field to toggle between two totally different states: a "local state" which makes it a regular entry field, and an "inherit state" which makes it a read-only entry field that displays a pre-set string. The user is shown a small, concise button to toggle between the states. An alternative voice or touch interface and method could also be used to implement the choice, such as "press or say one for the default/inherit value." The programmer specifies the initial state, also referred to as mode, whether it be local or inherit; the string to display in inherit mode; and the initial value for local mode. The programmer can subsequently query if the user chose the inherit mode or chose the local mode and if so, what local value she/he typed in.

With respect to FIG. 1a, a graphical user interface 100 having a toggleable widget 122 in accordance with features of the invention is shown. Other entry fields, such as the Parent Profile 102, the System Type 104, and the Host Name 106, have prior art dropdown lists 110 for entry fields. The graphical user interface 100 has a "Default User Id" field 120 that uses the new toggleable entry field widget 122 that allows the user to choose between, e.g., the inherited value that is currently set in this user's user preferences settings or a unique explicit value which in the example set forward is the connection definition. If the user chooses the inherited value Coulthar, as is shown in the entry field 126, then that inherited value passes its value onto all subsequent connection definitions. Notice the arrow button 124 to the left of the entry field 126. When the arrow 124 points left, this widget 122 is in "inherit" mode and the capability to enter data in entry field 126 is disabled. The widget's current inherit value Coulthar specified by the programmer is displayed. When the arrow button 124 is clicked by the user, it toggles to local mode and points to the right as shown in FIG. 1b. The entry field 126 then becomes enabled and the user can enter a value that is specific to this field, which in the example of FIGS. 1a and 1b, is a connection definition or user id.

Figure 2:
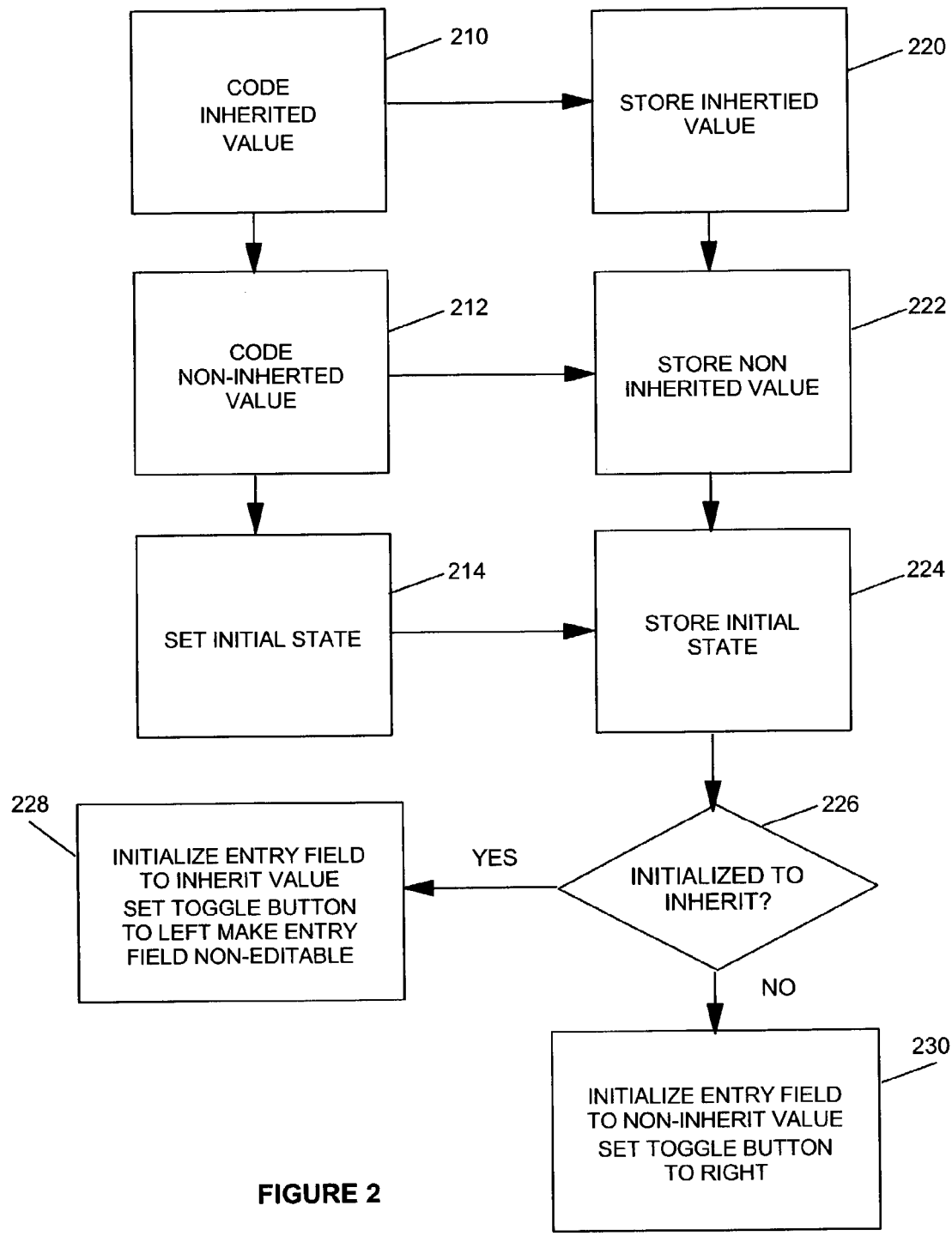
FIG. 2 is a simplified flow chart of a method to initialize a toggleable widget in accordance with an embodiment of the invention.

To create the widget using OOP, the programmer instantiates the widget and calls methods on it to set the local value, the inherited value, and the initial state of the toggle button. See, for example, the flow chart of FIG. 2 in which initialization of the widget 122 occurs, not necessarily in OOP but can be programmed according to the flow chart in a myriad of programming paradigms. In step 210, the programmer sets or instantiates the inherited value using code and in step 220, the inherited value is stored in the variable associated with the entry field. In step 212, the programmer codes a noninherited value that is stored in the variable in step 222. In step 214, the programmer codes the initial state of the widget/entry field and in step 224, the initial state is stored in the variable. If, in step 226, the initial state is "inherit," then in step 228, the entry field is initialized to the inherited value so that inherited value appears to the user in the entry field 126 of FIG. 1 a when the user interface first appears. The toggle button points to the left and the entry field becomes uneditable. If, however, the initial state has been coded and stored to be the noninherited value, then in step 230, the entry field displays the noninherited value to the user and the toggle button points to the right.

Other indicators beside left and right arrows may indicate if the widget is in an inheritable or noninheritable mode, e.g., the toggle button could have an "up" or a "down" arrow, an "I" for inherit or a "D" for default, or and "E" for Enter, depending upon the user interface, the language, and/or convention. The embodiment of the invention is not limited to specific icons that the programmer may use to indicate the mode of the entry field. The programmer also has the option of setting tool tip text, or hover help, individually for both the entry field and the toggle button. An example of hover help set and shown for the toggle button is seen in FIG. 1b at 130. Again, the binary decision to be made by the user is apparent in the hover help 130. Also optionally, the programmer can call a method to enable the code to return to a specific state/mode the user toggles between local and inherit modes.

The programmer's code then displays the widget to the user and, when appropriate, calls methods to read the user-entered local value, the inherit value, and the state or mode of the toggle button, whether local or inherit. When the user toggles back and forth between modes, the widget itself remembers the last entered local value in its memory and restores it in the entry field when toggling back to local mode.

Figure 3:
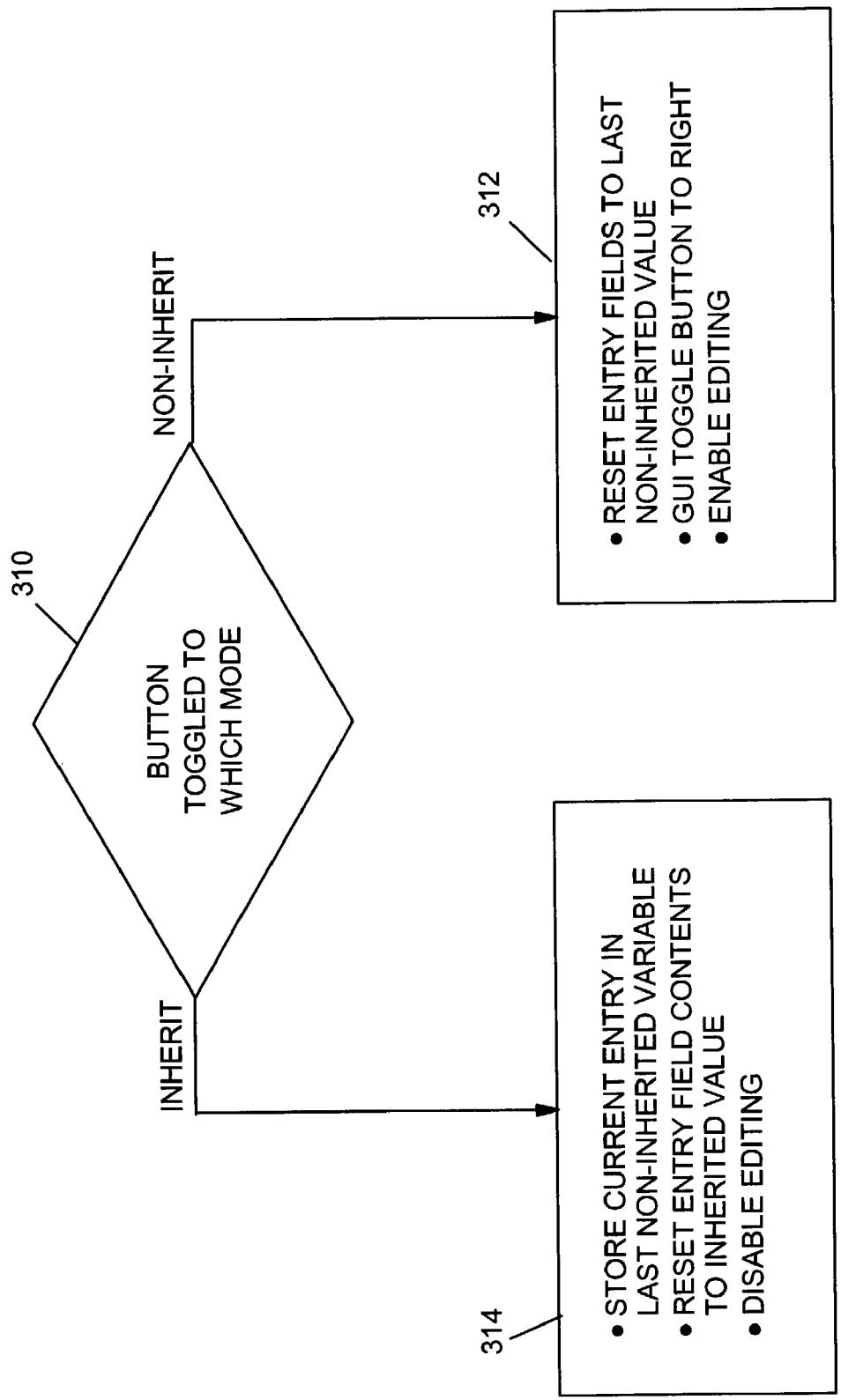
FIG. 3 is a simplified flow chart of a method in which a toggleable widget is used in accordance with an embodiment of the invention.

This widget makes it very easy for the programmer to code user interfaces that allow the user to choose between a preset value or enter in their own value. The programmer need only code a single widget and call a couple of methods to configure the widget. There is no need to code multiple widgets or do special case coding every time the value changes for the two possible states, as is the case with dropdown lists. Further, if the special value is a string such as first available port and the user-entered value must be numeric, such as a positive-integer value, the programmer's job is easy. Examples of special inputs may be a port number in which the user can either select the special value first available or explicitly enter a numeric port number. Another example of a tool or an application requiring a special input from the user may be the entry of a default userid for remotely signing onto a computer network. A particular request to sign on may allow the user to choose between using the default or allow the user to type in a specific userid just for this request. Yet, a third example of an application or tool requiring a special input value may be one which presents a hierarchy of objects such as a Java programmer's tool that shows methods within classes within projects. Certain properties, such as the current owner, may be inherited to all objects in the hierarchy. For each object the tool allows the user to either inherit that property from its parent object or override the parent's value with a new value local to that child object. In other words, a user can choose to have all class objects inherit their owner property from their parent object or override the owner property for one class while inheriting it for all the others. If an inherited property is changed at the parent level, all child objects automatically use the new inherited value unless they have overridden that value locally. A further advantage is that the error-checking code is enabled only when the widget is in local mode and is disabled when the widget is in inherit mode. The toggleable widget, moreover, benefits the end user in that the composite widget of the toggleable button and an entry field does not take up any more real-estate than a regular entry field. The simplified flow chart of FIG. 3 illustrates the ease of use during runtime of the widget and method of choosing between the inherit/noninherit mode. There are two choices: a special value in the inherit or default mode, or a value entered by the user in the local mode. The widget's disabling of the entry field in the inherit or default mode illustrates that the choice is binary.

In FIG. 3 it is the toggleable button 124 in FIGS. 1a and 1b that in step 310 triggers the inquiry from which of the two modes the information will be derived. If, as in step 312, the toggleable button is pointed to the direction or has the appropriate indicator for the local or noninherited mode, the entry field may be set to the last noninherited value, the toggle button or indicator is set for the noninherited or local mode, and the entry field is editable. If, however, the button is toggled to the inherit or default mode as in step 314, the value in the entry field is set to the last noninherited value, the contents of the entry field are reset to the inherit or default value, and entry field becomes noneditable.

Figure 4:
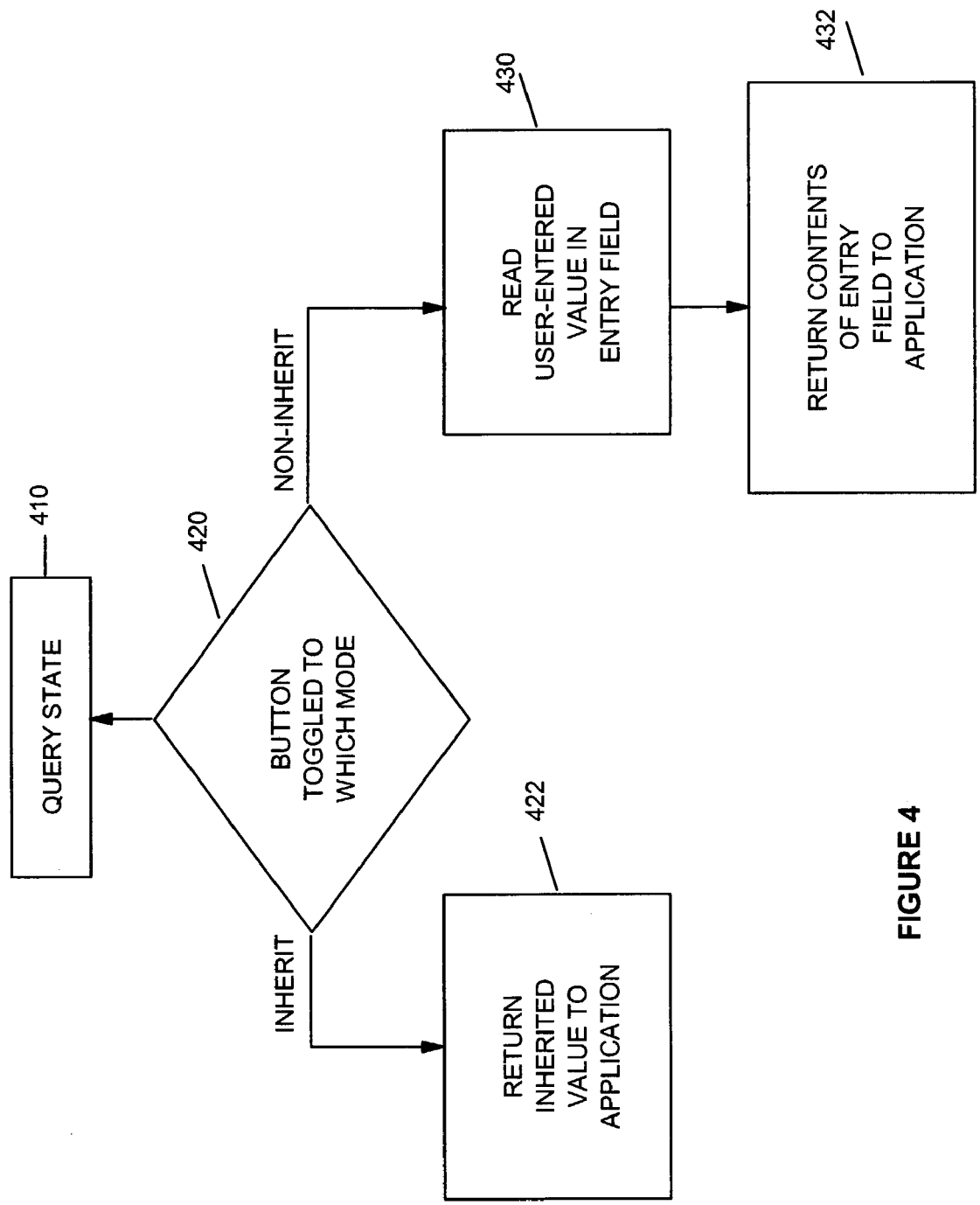
FIG. 4 is a simplified flow chart in which a toggleable widget stores a value and returns the value to an application in accordance with an embodiment of the invention.

FIG. 4 is a simplified flow chart of an example by which the information chosen or entered by the user in a graphical user interface embodiment is returned to the application. In step 410, the state of the toggleable widget is evaluated. If, in step 420, the toggle button points to the left or is otherwise enabled in the inherit mode, the graphical user interface returns the preset or inherited or default value to the application. If the toggle indicator is pointed to the right or is otherwise enabled in the noninherit mode, as in step 430, then the special value entered by the user in the entry field is read and, in step 432, that value is returned to the application. Note again that the dual nature of the toggleable widget is illustrated in that there may be two different data types, not just two values, for which to choose.

While various embodiments of the present invention have been described above, it should be understood that they have been presented by way of example and not limitation and that variations are possible. For instance, while the toggle button has been shown to be pointing to the right/left for the local/inherit modes, respectively, it need not be so. Two different yet self-teaching icons are all this is required. Moreover, the invention is not intended to be limited to an inherit mode in the context of object oriented programming. Examples of use in other than OOP include prompting for the first available port. Thus, the toggle need not toggle only between an inherited and a local override value; rather it may toggle between a special case value and all other values. In essence, the toggleable widget allows the user to decide between a value A that is the special case and is not editable and is offered as an alternative to entering a value, or a value B that is a non-special case range of option, prompted by an entry field or other appropriate widget for which error checking applies. As discussed earlier, while illustrated as a graphical user interface, the user interface may embody speech, speech recognition and/or touch capabilities, such as in "Press or say A to choose the first available port [or inherited value] or enter or say the value or name assigned to a specific port." This embodiment is particularly useful with mobile devices having a limited user interface. Again, the toggleable widget can be combined to have more than one interface or means by which to enter data; note that the above embodiment encompasses both speech and tactile. Thus, the breadth and scope of the present invention should not be limited by any of the above-described exemplary embodiments, but should be defined only in accordance with the following claims and their equivalents.

What is claimed is:

1. A method for presenting two options on a user interface of a microprocessor logic device, comprising:
   (1) presenting an entry field for input of data;
   (2) presenting a toggleable switch to activate the entry field;
   (3) allowing a user to input data in the entry field when the toggleable switch is activated in a first position; and
   (4) deactivating the entry field and displaying an inherited value in the entry field when the toggleable switch is in a second position.

2. The method of claim 1, further comprising the steps of:
   (1) communicating either the input data or the inherited value, depending upon the position of the toggleable switch, to an executing application.

3. The method of claim 2, wherein the executing application is connected to the microprocessor logic device through a network.

4. The method of claim 3, wherein the network is the Internet.

5. The method of claim 1, wherein the microprocessor logic device is a stand-alone computer.

6. The method of claim 1, wherein the microprocessor logic device is a personal digital assistant.

7. The method of claim 1, wherein the microprocessor logic device is a wireless telephone.

8. The method of claim 1, further comprising the steps of:
   (1) communicating the inherited value to the user.

9. The method of claim 8, wherein the step of communicating the inherited value to the user further comprises implementing a graphical user interface on the microprocessor logic device.

10. The method of claim 9, further comprising invoking hover help to set forth the inherited value and/or requesting input data from the user.

11. The method of claim 8, wherein the step of communicating the inherited value to the user further uses a voice or aural tones.

12. The method of claim 8, wherein the step of communicating the inherited value to the user further uses a tactile widget.

13. The method of claim 1, wherein the input data is of a different data type than the inherited value.

14. The method of claim 1, further comprising:
   (1) enabling error checking when the toggleable switch is in the first position.

15. The method of claim 2, wherein when the toggleable switch is in the second position, the inherited value is inherited from a parent class in object oriented programming; and when the toggleable switch is in the first position, the input data is not an inherited value from the parent class.

16. A computer program product including instructions embodied on a computer readable medium for providing a widget for use with an application having a user device on a logical device, the widget comprising:
   (1) a switch to manage an entry field wherein when the switch is in an inheritable mode, the widget presents an entry field that is a read-only entry field displaying a preset value determined by the application; and
   (2) when the switch is in a local mode, the widget presents an write-enable entry field to allow the user to enter a different value.

17. The computer program product of claim 16, wherein the preset value and the different value are of different data types.

18. The computer program product of claim 16, wherein the write-enable entry field engages error-checking capabilities.

19. A computer program product including instructions embodied on a computer readable medium tbr providing a user interface having a toggleable widget, the toggleable widget comprising:
   (1) a field having a first choice that is an inherited default noneditable choice; and
   (2) a toggle to change the field to one having a second choice entered by a user.

20. The computer program product of claim 19, further comprising an error checker to check for errors in the second choice entered by the user.

* * * * *

UNITED STATES PATENT AND TRADEMARK OFFICE
CERTIFICATE OF CORRECTION

PATENT NO. : 7,107,546 B2 Page 1 of 1
APPLICATION NO. : 10/286583
DATED : September 12, 2006
INVENTOR(S) : Phil Coulthard It is certified that error appears in the above-identified patent and that said Letters Patent is hereby corrected as shown below:

Column 8, line 54, replace "tbr" with:--for--

Signed and Sealed this

Fifth Day of December, 2006

JON W. DUDAS
*Director of the United States Patent and Trademark Office*